Patented July 24, 1934

1,967,399

UNITED STATES PATENT OFFICE 1,967,399

METHOD FOR THE PRODUCTION OF ALCOHOL FROM OLEFINES

William Engs and Richard Moravec, Berkeley, Calif., assignors to Shell Development Company, San Francisco, Calif., a corporation of Delaware No Drawing. Application June 1, 1931, Serial No. 541,527

8 Claims. (Cl. 260—156)

In one of our copending applications, we have described the continuous treatment of cracked petroleum fractions or the like, containing hydrocarbons of four or more carbon atoms, with a selective absorbent to effect the segregation of tertiary-base olefines, that is to say, olefines containing a carbon atom with no hydrogen attached to it.

In another of our copending applications, we have described the utilization of these fractions, from which the highly reactive tertiary-base olefine content has first been removed, with relatively concentrated sulfuric acid to form the intermediate alkyl hydrogen sulfates in the preparation of secondary alcohols.

Now we have discovered that when these mineral oil fractions are agitated vigorously with relatively concentrated acid, about 85 to 100% $H_2SO_4$ content, at temperatures below 80° F., preferably not above 60° F., the conditions are sufficient to cause reaction between the secondary-base olefine content (olefines capable of forming secondary alcohols by hydration) and the acid, yielding the corresponding alkyl hydrogen sulfates and a small amount of polymers. The paraffin hydrocarbons present, containing the same number of carbon atoms per molecule as the olefines in the fraction are unattacked by the acid. Only sufficient acid is added to combine with the olefine content or a slight excess (about 10% excess); in some instances less than one mole of acid per mole of olefine may be used depending on the temperature and acid strength, the alkyl hydrogen sulfates being miscible in the resulting acid solution and the solution, so formed, being immiscible with the paraffin hydrocarbons present. Mechanical separation of the two layers is easily effected in any manner as desired, as by centrifuging, siphoning or the like. The polymers present remain chiefly with the paraffin hydrocarbons. The saturated hydrocarbon layer containing the polymers may be utilized for blending purposes.

Prior to our discovery, it has been customary to dilute the alkyl hydrogen sulfate obtained by a sulfation process with water to a predetermined aqueous content followed by immediate distillation. Such procedure is not conducive to high yields of secondary alcohols as we have ascertained that dialkyl sulfates are contemporaneously present with alkyl hydrogen sulfates. The former decompose readily and rapidly under ordinary distilling conditions to their original status and the resulting secondary-base olefines distill over with the secondary alcohols formed, requiring further separation and treatment of the secondary-base olefines.

We have found that if the alkyl hydrogen sulfate layer is first diluted at normal conditions with an aqueous medium, such as water, aqueous secondary alcohol and the like, and permitted to stratify, a small top layer consisting largely of dialkyl sulfate is formed which can be easily removed by any well known mechanical separation. The dilution is carried out at room temperature or slightly higher but preferably at or below room temperature as segregation and not hydrolysis is desired at this stage. The small amount of dialkyl sulfate obtained is either mixed with weak acid, aqueous or acid solutions of alcohols, preferably of secondary alcohols, an alkyl hydrogen sulfate solution or water (either in the presence or absence of a suitable emulsifying agent) and heated, whereby it is transformed to the corresponding secondary alcohol dissolved in weak sulfuric acid. The addition of weak acid or water is controlled by desired operating conditions. We have obtained excellent results when the acidity of dibutyl sulfate solution is adjusted to contain 15% $H_2SO_4$. An alternative procedure is to treat the dialkyl sulfate with cold relatively strong acid of about 60% strength and higher, preferably with 60 to 85% strength acid, whereby the dialkyl sulfates are converted into alkyl hydrogen sulfates. The alkyl hydrogen sulfate solution from which the dialkyl sulfate content has been removed is in the meantime adjusted to the desired acidity, determined by operating conditions, and introduced into an evaporator together with the secondary alcohol solution or the alkyl hydrogen sulfate solution obtained by the treatment of the dialkyl sulfate. In treating butyl hydrogen sulfate, we have found it desirable to regulate the acid concentration thereof not above 30% $H_2SO_4$ in effecting the separation of the dibutyl sulfate— preferably about 15% $H_2SO_4$ or under. Distillation is employed to effect the removal of the resulting secondary alcohols from the sulfuric acid present. If desired, the solutions obtained from both layers may be hydrolyzed separately. The azeotropic mixture of alcohol and water is then treated in the customary manner to minimize the aqueous content of the constant boiling mixture.

Although we have described our process as applied to olefine-containing fractions from which highly reactive unsaturates as tertiary-base olefines have first been removed, our invention is no restricted thereto. It may be practiced with any mixture of alkyl hydrogen sulfates and dialkyl sulfates such as a mixture of propyl hydrogen sulfate and dipropyl sulfate or a mixture of ethyl hydrogen sulfate and diethyl sulfate. The process is pertinent as a general mode of separation of organo neutral sulfates from organo acid sulfates.

When resort is had to a butane-butene fraction, we have found it desirable to dilute the butyl hydrogen sulfate layer with water until the solution contains approximately 15% $H_2SO_4$, although with other alkyl hydrogen sulfate layers the amount of water added will vary, depending on the particular operating conditions and character of the alkyl hydrogen sulfate undergoing treatment. Our process can be operated with equal success with a pentane-amylene fraction and the like.

Although the mode of operation is not dependent upon the physical state of the reactants, it is preferable to execute the same in a liquid system, as greater surface contact is thereby afforded.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process for the preparation of secondary alcohols from olefines present in a fraction obtained from cracked petroleum oil from which tertiary-base olefines have been preliminarily removed, the steps of sulphating the secondary-base olefines present in the fraction by admixing said fraction with 85 to 100% sulfuric acid while maintaining an acid concentration and a temperature at which sulfation of said secondary-base olefines takes place, separating the resulting alkyl hydrogen sulfates from the unattacked paraffin hydrocarbons, diluting the acid solution with an aqueous medium, effecting the stratification of the diluted acid solution, removing the layer containing the dialkyl sulfates and hydrolyzing the alkyl hydrogen sulfate layer.

2. In a process for the preparation of secondary alcohols from olefines present in a fraction obtained from cracked petroleum oil from which tertiary-base olefines have been preliminarily removed, the steps of sulfating the secondary-base olefines present in the fraction by admixing said fraction with 85 to 100% sulfuric acid while maintaining an acid concentration and a temperature at which sulfation of said secondary-base olefines takes place, separating the resulting alkyl hydrogen sulfates from the unattacked paraffin hydrocarbons, diluting the acid solution with an aqueous medium, effecting the stratification of the diluted acid solution, removing the layer containing the dialkyl sulfates, converting the dialkyl sulfate layer to an acid liquor containing a smaller percentage of dialkyl sulfate, combining the acid liquor with the initial alkyl hydrogen sulfate layer and simultaneously hydrolyzing both layers.

3. In a process for the preparation of secondary alcohols from olefines present in a fraction obtained from cracked petroleum oil and predominantly consisting of hydrocarbons containing not less than four carbon atoms from which tertiary-base olefines have been preliminarily removed, the steps of sulfating the secondary-base olefines present in the fraction by admixing said fraction with 85 to 100% sulfuric acid while maintaining an acid concentration and a temperature at which sulfation of said secondary-base olefines takes place, separating the resulting alkyl hydrogen sulfates from the unattacked paraffin hydrocarbons, diluting the acid solution with an aqueous medium, effecting the stratification of the diluted acid solution, removing the layer containing the dialkyl sulfate and hydrolyzing the alkyl hydrogen sulfate layer.

4. In a process for the preparation of secondary alcohols from olefines present in a fraction obtained from cracked petroleum oil and predominantly consisting of hydrocarbons containing not less than four carbon atoms from which tertiary-base olefines have been preliminarily removed, the steps of sulfating the secondary-base olefines present in the fraction by admixing said fraction with 85 to 100% sulfuric acid while maintaining an acid concentration and a temperature at which sulfation of said secondary-base olefines takes place, separating the resulting alkyl hydrogen sulfates from the unattacked paraffin hydrocarbons, diluting the acid solution with an aqueous medium, effecting the stratification of the diluted acid solution, removing the layer containing the dialkyl sulfates, converting the dialkyl sulfate layer to an acid liquor containing a smaller percentage of dialkyl sulfate, combining the acid liquor with the initial alkyl hydrogen sulfate layer and simultaneously hydrolyzing both layers.

5. In a process for the preparation of secondary alcohols from olefines present in a fraction obtained from cracked petroleum oil and predominantly consisting of hydrocarbons containing four carbon atoms from which isobutylene has been preliminarily removed, the steps of sulfating the butenes present in the fraction by admixing said fraction with 85 to 100% sulfuric acid while maintaining an acid concentration and a temperature at which sulfation of said butenes takes place, separating the resulting butyl hydrogen sulfate from the unattacked butane, diluting the acid solution with an aqueous medium, effecting the stratification of the diluted acid solution, removing the layer containing the dibutyl sulfate and hydrolyzing the butyl hydrogen sulfate layer.

6. In a process for the preparation of secondary alcohols from olefines present in a fraction obtained from cracked petroleum oil and predominantly consisting of hydrocarbons containing four carbon atoms from which isobutylene has been preliminarily removed, the steps of sulfating the butenes present in the fraction by admixing said fraction with 85 to 100% sulfuric acid while maintaining an acid concentration and a temperature at which sulfation of said butenes takes place, separating the resulting butyl hydrogen sulfate from the unattacked butane, diluting the acid solution with an aqueous medium, effecting the stratification of the diluted acid solution, removing the layer containing the dibutyl sulfate, converting the dibutyl sulfate layer to an acid liquor containing a smaller percentage of dibutyl sulfate, combining the acid liquor with the initial butyl hydogen sulfate layer and simultaneously hydrolyzing both layers.

7. In a process for producing secondary alcohols from olefines, the steps of diluting an acid mixture of substantially only secondary butyl hydrogen sulfate and secondary dibutyl sulfate with an aqueous medium, effecting the stratification of the diluted acid solution, removing the layer containing the secondary dibutyl sulfate and hydrolyzing the secondary butyl hydrogen sulfate layer.

8. In a process for producing secondary alcohols from olefines, the steps of diluting an acid mixture of substantially only secondary butyl hydrogen sulfate and secondary dibutyl sulfate with an aqueous medium, effecting the stratification of the diluted acid solution, removing the layer containing the secondary dibutyl sulfate, converting the secondary dibutyl sulfate layer to an acid liquor containing a smaller percentage of secondary dibutyl, combining the acid liquor with the other layer resulting from the stratification of the diluted acid solution, and simultaneously hydrolyzing both layers.

WILLIAM ENGS.
RICHARD MORAVEC.